Nov. 7, 1967
G. R. ANDERSON
3,351,204
FILTERING DEVICE
Filed July 20, 1965
4 Sheets-Sheet 1
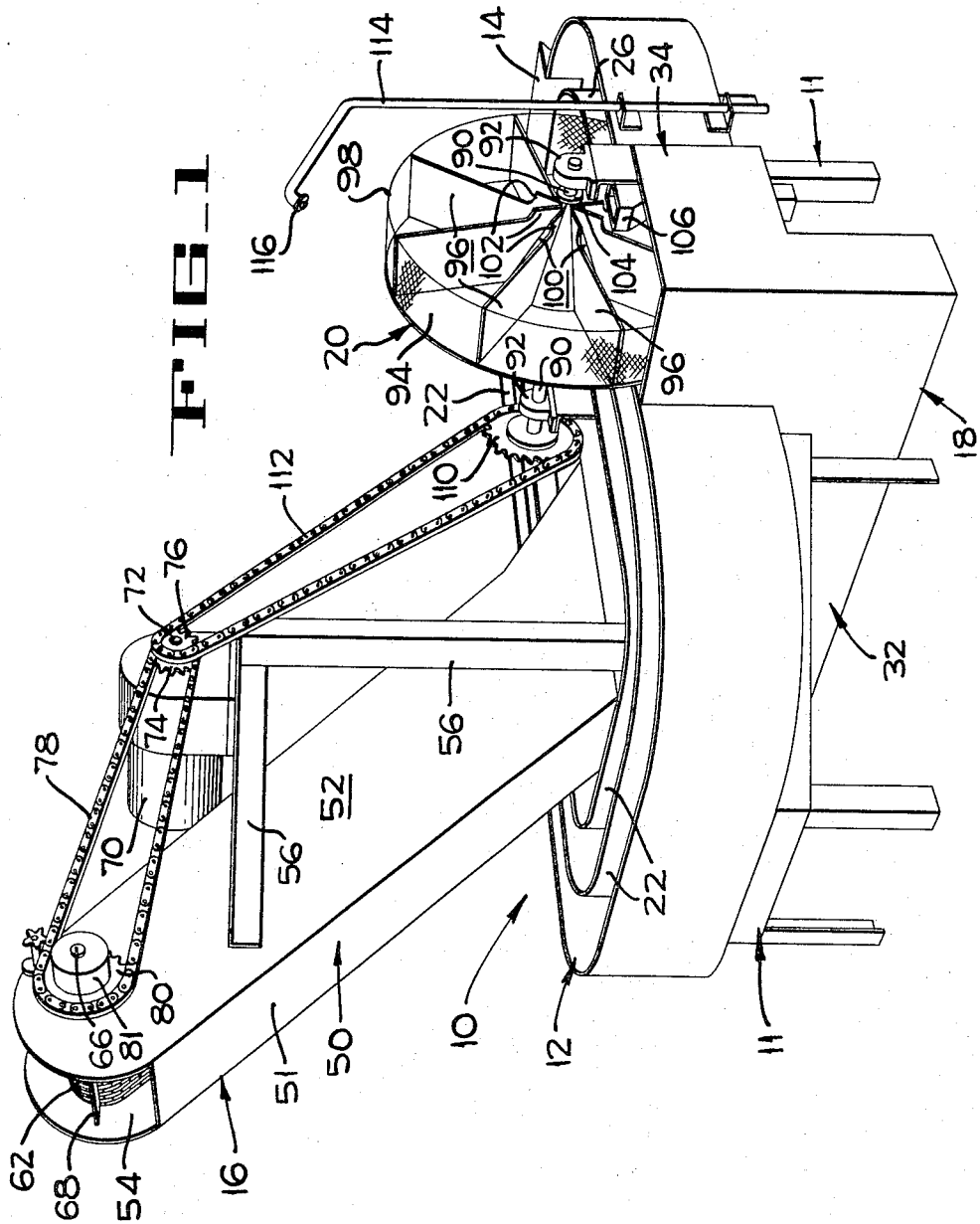
FIG_1
INVENTOR
GERALD R. ANDERSON
BY Hans G. Hofmeister
ATTORNEY Nov. 7, 1967  G. R. ANDERSON  3,351,204
FILTERING DEVICE
Filed July 20, 1965  4 Sheets-Sheet 2
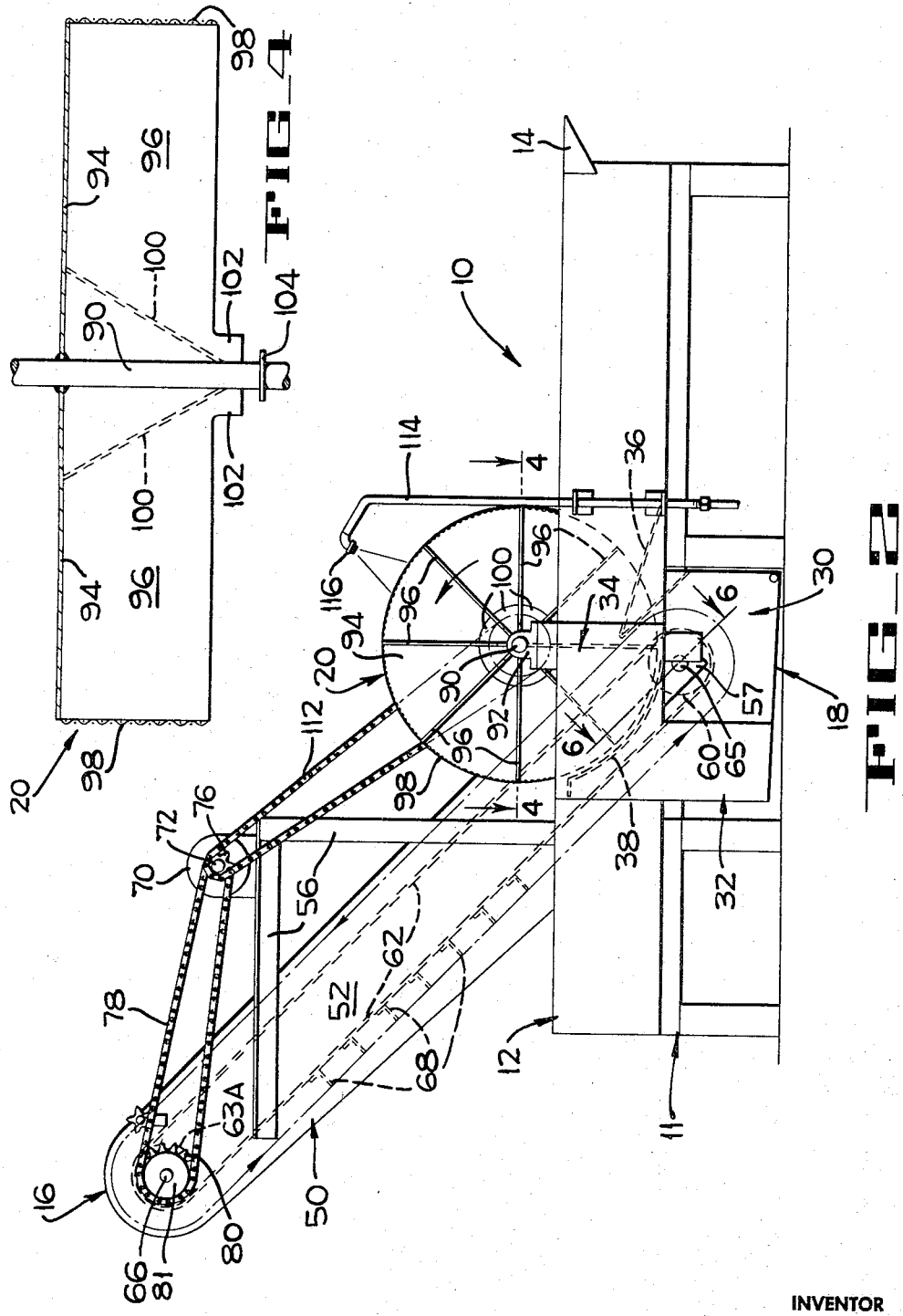
INVENTOR
GERALD R. ANDERSON
BY Hans G. Hoffmeister.
ATTORNEY

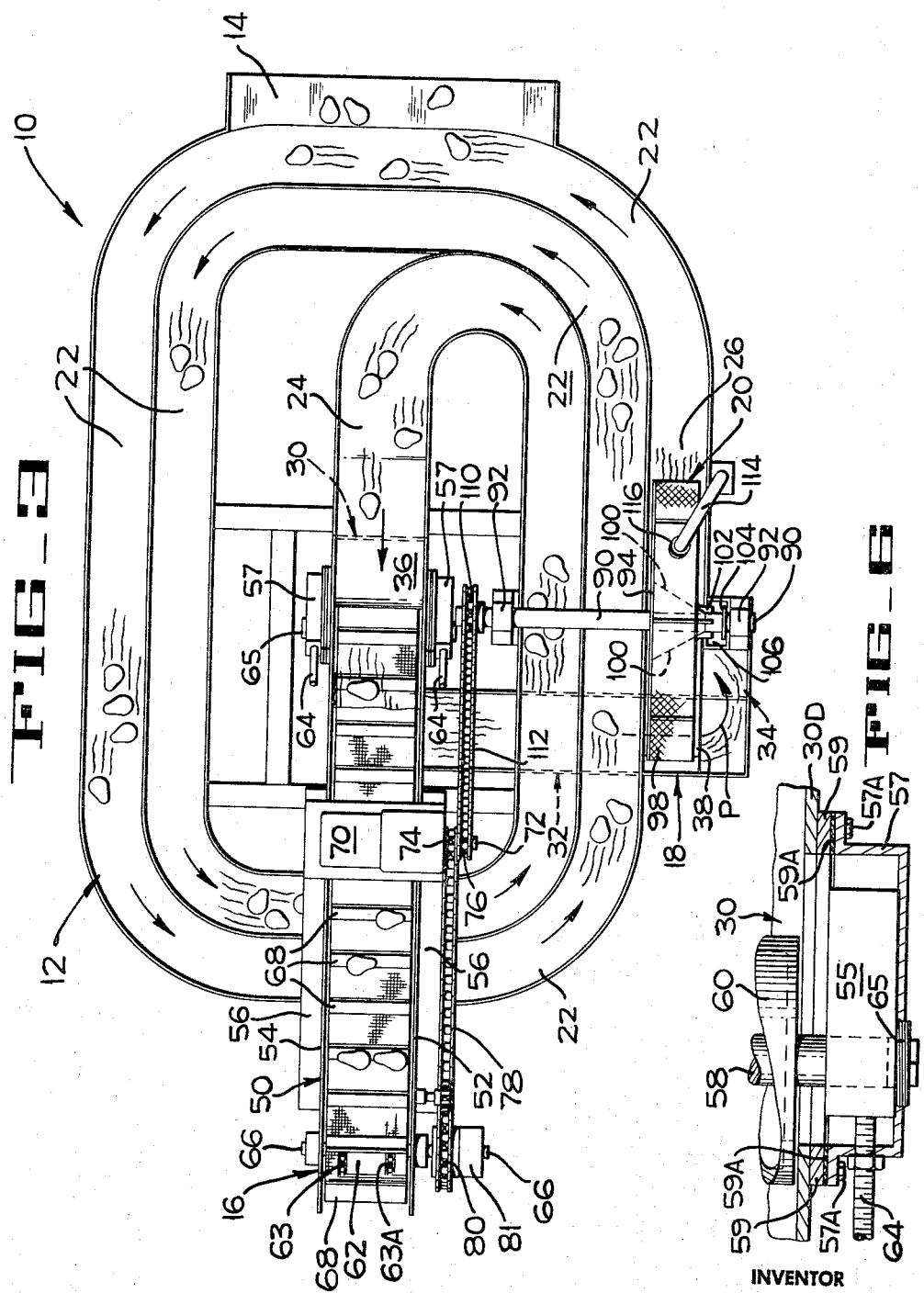

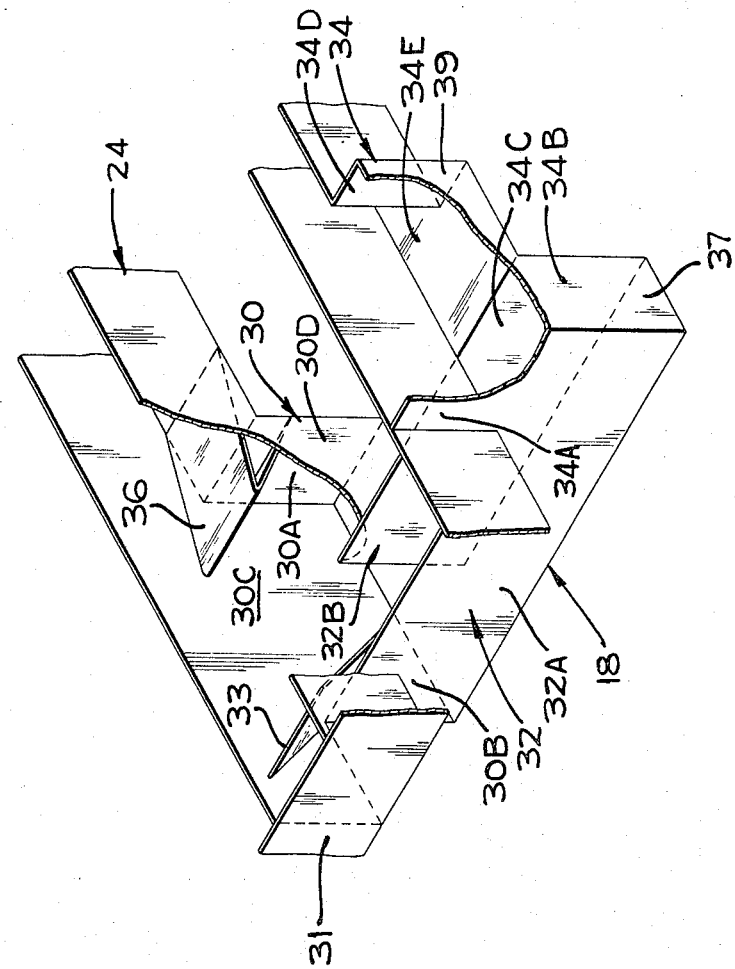

United States Patent Office 3,351,204
Patented Nov. 7, 1967

3,351,204
FILTERING DEVICE
Gerald R. Anderson, Campbell, Calif., assignor to FMC Corporation, San Jose, Calif., a corporation of Delaware
Filed July 20, 1965, Ser. No. 473,443
6 Claims. (Cl. 210—158)

ABSTRACT OF THE DISCLOSURE

A fruit processing device having a spiral fluid guiding flume in which the fruit is circulated with processing liquid. An elevator is located in the flume to remove the fruit therefrom after processing. A paddle wheel strainer is located in the flume downstream of the elevator to remove foreign matter from the circulating processing liquid and to recirculate the liquid through the flume.

The present invention pertains to a filtering device and, more particularly, to a device for removing food particles from a circulating mixture in a processing line.

In preparing food, such as pears, for a subsequent canning operation it often becomes necessary to provide an accumulator at some point in the processing line wherein the pears may be held without stopping the upstream end of the processing line when a delay occurs at a point downstream in the processing line. This accumulator may take the form of an elongated flume containing fluid which is sometimes chemically treated to preserve the pears in good condition for canning. Depending upon where the accumulator is positioned in the processing line, a certain amount of undesirable foreign matter or particles of the pears are also carried into the flume by the pears. For example, if the accumulator is positioned in the processing line just downstream of the skin removing unit of the line, the fluid in the flume will collect pieces of the disintegrated skin, whereas if the accumulator is positioned in the line just downstream of the coring and stemming unit, a portion of the core material and calyx cut material will be collected in the fluid along with what is commonly called "slough-off" portions of the outer layers of the pears which are rubbed off during mechanically handling of the pears. Heretofore it was necessary to remove this foreign matter from the fluid in the flume manually.

Therefore, it is an object of the present invention to provide a novel, inexpensive device for removing food particles from a circulating mixture.

Another object is to provide a circulating and filtering device for removing food particles from a mixture while simultaneously circulating the mixture.

Another object is to provide a device for removing undesirable particles of pears from a fluid mixture in an accumulator in a pear processing line.

Another object is to provide a device which will filter out undesirable particles from a fluid mixture in an accumulator in a pear processing line while simultaneously causing the fluid in the accumulator to circulate within the accumulator.

In principle, these objects are accomplished by removing the pears, then causing the mixture to flow through a restricted area and subjecting it to a screening operation wherein the undesirable particles are removed from the mixture and discharged out of the processing line.

The invention will be best understood by referring to the following detailed description and the accompanying drawings, in which:

FIGURE 1 is a perspective of the accumulator and filtering system of the invention.

FIGURE 2 is a diagrammatic side elevation of the system shown in FIGURE 1.

FIGURE 3 is a diagrammatic plan of the system shown in FIGURE 1.

FIGURE 4 is an enlarged section taken along the lines 4—4 shown in FIGURE 2.

FIGURE 5 is a diagrammatic perspective of a portion of the liquid circulating system of FIGURE 1.

FIGURE 6 is a fragmentary section taken along lines 6—6 of FIGURE 2.

In general, the accumulator 10 shown in the drawings comprises a support frame 11 upon which is mounted an elongated flume 12 having an inlet chute 14 (FIG. 3) and an outlet elevator 16. In flow communication with the flume 12 is a reservoir 18 which receives liquid from the flume and delivers it to a circulating and filtering unit 20. The accumulator is placed between the desired units in a pear processing line, not shown, such that pears are discharged from the next upstream unit of the line into the inlet chute 14 where they are guided into the circulating fluid and carried along a generally spiral path to the outlet elevator 16 from which they are subsequently discharged into the next downstream unit of the line. The undesirable matter which enters along with the pears is carried by the circulating fluid to the circulating and filtering unit 20 where the undesirable matter is removed. The filtered fluid then continues in the flume toward the inlet and the cycle is repeated.

The flume 12 comprises an elongated U-shaped channel 22 which is curved at right angles corresponding to the corners of a rectangle having progressively decreasing sides much in the same manner as a spiral. At the innermost end of the spiral the channel widens into a discharge portion 24 which communicates with one end of the reservoir 18. The outer end of the U-shaped channel forms a cleaning or inlet portion 26 which also communicates with the reservoir and houses the circulating and filtering unit 20. The flume and reservoir thus provide a continuous guideway for circulating the fluid F contained therein.

The reservoir 18 comprises a large basin portion 30 (FIG. 2) which underlies the lower end of the elevator, a central conduit portion 32 (FIGS. 2 and 3), and a tank portion 34. Connected to the bottom wall of the discharge portion 24 of the U-shaped channel and an end wall 30A of the basin 30 is an upwardly inclined deflector 36 which overlies part of the basin 30 and forms a smooth transition surface between the bottom wall of the discharge portion of the U-shaped flume and the elevator 16. As seen in FIGURE 5, the ends of the side walls of the discharge portion 24 of the flume are connected by a side wall 31 of another portion of the flume, and an inclined overflow wall 33 extends upwardly from the basin end wall 30B. The basin is provided with a floor and side walls 30C and 30D that may be formed as vertical extensions of the side walls of the flume.

The central conduit 32 has a bottom wall flush with the bottom wall of the basin 30 and upstanding side walls 32A and 32B. This conduit is open at the top except where it passes under portions of the flume. The tank 34 has bottom and side walls that form continuations of the bottom and side walls of the conduit 32, one side wall 34A being arranged to extend upwardly to the level of the upper edges of the flume. In general, the tank 34 has a lower portion 37 and an upper portion 39, the lower portion being defined by the bottom wall, the lower portion of wall 34A, the lower portion of an end wall 34B, and a wall portion 34C that forms an extension of the conduit side wall 32B. The upper portion of tank 34 is defined by the upper portions of walls 34A and 34B, a short wall 34D, a floor 34E and one wall of the adjacent flume.

Mounted on the walls of the upper portion 39 of the tank is a smoothly curved plate 38 (FIG. 2) which is disposed close to the periphery of the circulating and filtering unit. The plate 38 is joined to the bottom wall and an inner upright side wall of the flume by any suitable means and in such a manner that the fluid in the tank portion of the reservoir must enter the circulating and filtering unit 20 from the side as shown by the arrow P (FIG. 3).

The elevator 16 comprises a housing 50 having a rear wall 51, and upstanding side walls 52 and 54 which are fastened at their lowermost ends to the side walls of the discharge portion 24 of the flume and connected at spaced locations along their lengths to a support member 56 connected to the frame 11. Extending through the basin 30 of the reservoir is a horizontal lower shaft 58 (FIG. 6) which is rotatably mounted in the side walls of the basin. Keyed to the shaft is a roller 60 around which is entrained a conveyor belt 62 that is made of wire mesh.

The lower shaft 58 is rotatably mounted at each end in a bearing block 55 that is slidably disposed in a guide channel provided by a housing 57 (FIG. 6). The housing 57 is secured by capscrews 57A to a plate 59 that is welded to the adjacent wall of the flume, a gasket 59A being disposed between the plate 59 and the housing 57 to provide a water-tight joint. The shaft 58 is adjusted to regulate the tautness of the conveyor belt 62 by means of two adjusting screws 64 that are threaded through the housings 57 and engage the bearing blocks to shift them in the housing. A pipe plug 65 is threaded into each housing to provide access to the shaft 58 when desired.

The conveyor belt 62 is also trained around a pair of wide sprockets 63 and 63A which are keyed to an upper shaft 66 and have teeth projecting through the wire mesh belt 62 in driving engagement. The shaft 66 is rotatably mounted in bearings carried by the side plates 52 and 54. The conveyor belt is provided with outwardly extending flights 68 to lift the pears passing out of the discharge portion 24 of the flume, while the mixture of fluid and foreign matter is free to pass through the links into the reservoir. The drive for the conveyor comprises a motor 70 mounted on the support member 56 and having a drive shaft 72 extending outwardly therefrom. Keyed to the shaft 72 are inner and outer drive sprockets 74 and 76 respectively. Trained around the sprocket 74 is a drive chain 78 which is also trained around a sprocket 80. The sprocket 80 is drivingly connected to the shaft 66 of the elevator by a conventional clutch, shown diagrammatically as element 81, which may be engaged and disengaged by a lever (not shown) that extends downwardly to a point within reach of an operator. Thus, when the clutch is engaged, counterclockwise rotation of the motor shaft 72 (FIG. 2) will cause counterclockwise movement of the belt 62, and the belt will lift the pears out of the accumulator to be discharged at the upper end of the elevator to a conveyor or the like leading to the next downstream unit of the processing line.

The circulating and filtering unit 20 comprises a shaft 90 rotatably mounted in a set of bearing blocks 92 which are fastened to brackets welded to the side walls of the U-shaped channel 22. Fixed to the shaft 90 as by welding is a radially extending circular back wall 94 and a plurality of equi-distantly spaced paddles or impellers 96 which are also connected as by welding to the back wall 94 to give them added rigidity. The outer ends of the paddles are circumscribed by a screen 98 which is made of any suitable material, such as wire cloth, having interstices of sufficient magnitude to freely pass fluid while retaining the foreign matter carried by the fluid. Spaced between each of the adjacent paddles are a plurality of sections 100 (FIGS. 2 and 4) of a conical frustum which are fastened as by welding to adjacent paddles and to the back wall in such a manner that they extend slightly axially outward beyond the main area of the paddles. Thus, as best shown in FIGURES 1, 2 and 4, the sections 100 form the frustum of a cone pointed axially outward along the shaft 90, the smooth surface of which is broken only by the respective paddles.

Each of the paddles 96 is provided with an axially disposed projection 102 which extend slightly farther outwardly along the shaft 90 than the terminal end of the sections 100. A disc 104 is fastened to the shaft between the outwardly extending projections and the outer bearing block 92. A rectangular funnel 106 (FIG. 3) is mounted in the tank portion 34 below the terminal ends of the sections 100 and the disc 104 such that material deflected in this area will fall into the funnel and be directed to an appropriate receptacle or other disposal system. A sprocket 110 (FIG. 1) is keyed to the innermost end of the shaft 90 and has trained therearound a chain 112 which is also trained around the outer drive sprocket 76 on the motor shaft. Thus, energization of the motor 70 causes simultaneous counterclockwise movement of the conveyor belt 62 and of the circulating and filtering unit 20. Rotation of the circulating and filtering unit 20 causes fluid and particles carried thereby to be drawn in through the open side between the paddles 96. The fluid is then emitted through the screen 98 and passes downstream of the unit while the foreign particles collect on the inside surface of the screen.

A water pipe 114 (FIG. 1) is fastened to the side wall of the U-shaped channel and extends upwardly overlying the circulating and filtering unit 20 and is terminated by a nozzle 116. The water pipe 114 is connected to any suitable water supply, not shown, which, when turned on causes a forceful spray of fluid to be directed at the outer surface of the screen. The fluid impinges on the screen and passes through the interstices, washing the foreign particles from the inside surface of the screen and moving them down between the paddles 96 and axially outward toward the disc 104. The angularity and size of the sections 100 may be varied depending on the speed of rotation to induce a greater flow of the sprayed fluid and foreign particles axially outward. When the mixture of spray fluid and foreign particles reach the terminal ends of the projection 102, it falls into the funnel 106 and consequently is discharged to a disposal system. Any material which should creep outwardly along the shaft 90 will engage the disc 104 and be directed downwardly into the funnel.

Alternatively it will be understood that each conical segment may be integral with adjacent segments, the paddles in such instance being attached to the cone. In addition any variation of the paddles may be used which will guide the wash water toward the central axis, as for example, paddles which are tangential to a central cone rather than radial. Also, the conical segments may be replaced by other structure which deflects the wash water outwardly into the funnel.

In the over-all operation of the accumulator, pears and undesirable particles of pears, such as pieces of the removed core and the like, are fed into the flume 12 through the inlet chute 14. The pears and particles become mixed with the fluid traveling in the direction of the arrows shown in FIGURE 3 and are carried in a counterclockwise path to the discharge portion 24 of the flume. The pears are engaged by the flights 68 and are carried upwardly thereby and discharged at the upper end of the elevator into the next downstream unit of the processing line. Due to the fact that the paddles cause circulation of the liquid, the liquid with the intermixed particles passes into the basin portion 30 of the reservoir and passes through the central conduit 32 into the tank 34. In the tank the fluid and particles are drawn upwardly and inwardly into the circulating and filtering unit 20 where the fluid passes through the screen to be recirculated around the flume while the particles are entrapped against the inner surface of the screen. When the screen is rotated upwardly and passes beneath the spray emitting from the nozzle 116, the particles are washed radially inwardly along the paddles 96 and out of the unit along the sections 100 to be discharged into the funnel 106. Consequently, the accumulator is cleared of substantially all of the undesirable particles of the pears continuously without the need to stop the machine for cleaning purposes.

Thus, there is provided an extremely advantageous and inexpensive apparatus for continually screening the treating fluid. In addition, the apparatus increases the efficiency of the accumulator by combining in a single unit the circulating and filtering features of the invention.

It will be understood that changes and modifications may be made in the disclosed apparatus without departing from the spirit of the invention. It is to be understood, therefore, that the scope of the invention should be limited only by the scope and proper interpretation of the claims appended hereto.

Having thus described the invention, that which is believed to be new and for which protection by Letters Patent is desired is:

1. A filtering device for use in an accumulator for a fruit processing line comprising means for guiding a flow of fluid along an elongated path; means for introducing fruit and particles of fruit into the fluid; discharge means for removing the fruit from the mixture of fluid and particles of fruit; a filtering element positioned downstream of said discharge means for removing the particles of fruit from the fluid, said filtering element including a rotary shaft, a circular back wall partially submerged in the liquid, and a screen circumscribing said shaft and extending axially from said wall; a frusto-conical diverter disposed around said shaft and terminating at its smaller end closely adjacent the circular opening defined by said screen, spray means for directing liquid inwardly through said screen, and means to rotate said shaft whereby said screen is first passed through said circulating fluid and particles of the fruit enter the space between said screen and said frusto-conical means and cling to the inner surface of said screen and is then washed by said spray means to force the particles off said screen and onto said frusto-conical diverter for discharge out of said filtering element through the circular side opening.

2. A circulating and screening device for use in a food processing line comprising fluid guiding means including a flume having a discharge portion and an inlet portion adapted to receive a mixture of food particles, food and liquid, means for removing the food from the mixture, a rotary paddle element positioned in said fluid guiding means between said inlet portion and discharge portion for inducing said mixture to move through said fluid guiding means, said paddle element having a screening portion positioned to intercept the mixture after the food is removed to filter out the food particles, and means for removing the food particles from the screening portion whereby the fluid is substantially recirculated free of food and food particles.

3. The device defined by claim 2 wherein said means for removing the food particles from the screening portion includes sections connected to said rotary paddle element and defining a conical frustum.

4. A device according to claim 2 wherein said fluid guiding means is endless and wherein said flume is in the form of a channel of generally spiral configuration which flume acts as an accumulator for accommodating a large quantity of the food being processed.

5. A circulating and screening device for use in a food processing line comprising means for guiding a mixture of food particles, food and fluid along a predetermined path, means positioned in said path for removing the food from the mixture, a paddlewheel-filter element positioned in said path downstream of said food removing means and including a plurality of radially extending impellers, means for rotating said element such that said impellers will move the fluid along said path, a screen circumscribing the terminal ends of said impellers, deflector sections circumscribing the axis of said paddlewheel-filter, and a fluid spray nozzle positioned adjacent said screen such that fluid emitted from said nozzle will impinge against said screen whereby the particles of food entrapped in said screen will be washed therefrom as said element is rotated and guided axially outward of said paddlewheel-filter element by said deflector sections leaving the fluid substantially free of food particles and food.

6. A device according to claim 5 wherein said fluid guiding means is endless and includes a portion that is in the form of a channel of generally spiral configuration which acts as an accumulator for accommodating a large quantity of the food being processed.

References Cited

UNITED STATES PATENTS

| | | | |
|---|---|---|---|
| 1,516,962 | 11/1924 | Gunsolley | 99—406 |
| 1,680,848 | 8/1928 | Bishop | 210—158 |
| 1,726,608 | 9/1929 | Brackett | 210—161 |
| 1,757,103 | 5/1930 | Voigt. | |
| 2,580,420 | 1/1952 | Griswold et al. | 134—104 X |
| 2,646,888 | 7/1953 | Schichtl | 210—161 X |
| 2,901,113 | 8/1959 | Newell | 210—158 |

FOREIGN PATENTS

| | | |
|---|---|---|
| 449,044 | 6/1948 | Canada. |
| 177,849 | 1/1962 | Sweden. |

SAMIH N. ZAHARNA, *Primary Examiner.*

REUBEN FRIEDMAN, *Examiner.*

D. M. RIESS, *Assistant Examiner.*